(12) United States Patent
Wang et al.

(10) Patent No.: US 11,535,189 B2
(45) Date of Patent: Dec. 27, 2022

(54) BELT STRAP FOR A SAFETY BELT DEVICE OF A MOTOR VEHICLE

(71) Applicant: AUTOLIV DEVELOPMENT AB, Vargarda (SE)

(72) Inventors: Tommy Wang, Suzhou (CN); Bob Chen, Suzhou (CN); Raphael Tao, Suzhou (CN); Willi Welz, Veghel (NL); Frank Gan, Suzhou (CN); Kai-Stephan Müller, Oelixdorf (DE); Chris Van Helvoort, Boxtel (NL); Victoria Drews, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 53 days.

(21) Appl. No.: 17/257,161

(22) PCT Filed: Jul. 3, 2019

(86) PCT No.: PCT/EP2019/067848
§ 371 (c)(1),
(2) Date: Dec. 30, 2020

(87) PCT Pub. No.: WO2020/007912
PCT Pub. Date: Jan. 9, 2020

(65) Prior Publication Data
US 2021/0268988 A1     Sep. 2, 2021

(30) Foreign Application Priority Data

Jul. 3, 2018   (DE) ..................... 10 2018 210 890.9

(51) Int. Cl.
*B60R 22/12* (2006.01)
*D03D 11/02* (2006.01)

(52) U.S. Cl.
CPC .............. *B60R 22/12* (2013.01); *D03D 11/02* (2013.01)

(58) Field of Classification Search
CPC .. D03D 15/00; D03D 1/0005; D10B 2331/04; D10B 2401/062; D10B 2331/02; D10B 2505/122
See application file for complete search history.

(56) References Cited

U.S. PATENT DOCUMENTS

| | | | | |
|---|---|---|---|---|
| 5,376,440 A * | 12/1994 | Koseki | ................. | D03D 1/0005 297/483 |
| 6,439,601 B1 * | 8/2002 | Iseki | .................... | D03D 1/0005 280/733 |
| 10,391,965 B2 * | 8/2019 | Spahn | .................... | B60R 21/276 |
| 10,442,392 B2 * | 10/2019 | Gath | ...................... | B60R 22/12 |

(Continued)

FOREIGN PATENT DOCUMENTS

| | | |
|---|---|---|
| DE | 2508732 A1 | 9/1976 |
| DE | 19932940 A1 | 1/2001 |

(Continued)

*Primary Examiner* — Toan C To
(74) *Attorney, Agent, or Firm* — Dickinson Wright PLLC

(57) ABSTRACT

The present invention relates to a belt strap for a safety belt device of a motor vehicle. The belt strap includes at least one cavity for receiving electronic components and/or lines. The cavity is formed by two fabric layers which are connected to one another in the outer edge sections by means of one or more weave thread/weave threads running parallel to the longitudinal direction of the belt strap.

11 Claims, 3 Drawing Sheets

(56) References Cited

U.S. PATENT DOCUMENTS

| | | | |
|---|---|---|---|
| 10,479,162 B2 * | 11/2019 | Elson | B60H 1/2225 |
| 10,562,484 B2 * | 2/2020 | Helvoort | B60R 22/34 |
| 10,569,735 B2 * | 2/2020 | Elson | B60R 22/12 |
| 11,021,346 B2 * | 6/2021 | Babinchak | D03D 1/0094 |
| 2012/0192988 A1 * | 8/2012 | Welz | D03D 1/0005 |
| | | | 139/383 R |
| 2013/0193727 A1 | 8/2013 | Rodemer | |
| 2013/0313811 A1 * | 11/2013 | Ichida | B60R 21/233 |
| | | | 280/733 |
| 2014/0135906 A1 * | 5/2014 | Winner | D03D 3/02 |
| | | | 600/36 |
| 2016/0236641 A1 * | 8/2016 | Okubo | B60R 21/231 |
| 2017/0021141 A1 * | 1/2017 | Osbrink | A61M 25/10 |
| 2018/0140880 A1 * | 5/2018 | Rea | A62C 35/13 |
| 2019/0176566 A1 * | 6/2019 | Maranville | B60R 22/12 |
| 2019/0344743 A1 * | 11/2019 | Jaradi | B60R 21/231 |
| 2021/0102316 A1 * | 4/2021 | Jayasuriya | D03D 1/0005 |
| 2021/0309179 A1 * | 10/2021 | Zhang | H05B 3/34 |
| 2021/0339700 A1 * | 11/2021 | Rausch | D03D 15/275 |

FOREIGN PATENT DOCUMENTS

| | | |
|---|---|---|
| DE | 202017105538 U1 | 9/2017 |
| EP | 1141455 A1 | 10/2001 |
| EP | 1278901 B1 | 2/2005 |
| EP | 2832907 B1 | 2/2019 |
| EP | 3204543 B1 | 7/2019 |
| WO | 200105630 A1 | 1/2001 |
| WO | 0144547 A2 | 6/2001 |
| WO | 2016/071528 A1 | 5/2016 |

\* cited by examiner

BELT STRAP FOR A SAFETY BELT DEVICE OF A MOTOR VEHICLE

CROSS-REFERENCE TO RELATED APPLICATIONS

This application is a 35 U.S.C. § 371 national phase of PCT International Application No. PCT/EP2019/067848, filed Jul. 3, 2019, which claims the benefit of priority under 35 U.S.C. § 119 to German Patent Application No. 10 2018 210 890.9, filed Jul. 3, 2018, the contents of which are incorporated herein by reference in their entirety.

FIELD

The present invention relates to a belt strap for a safety belt device of a motor vehicle.

BACKGROUND

Belt straps in safety belt devices of motor vehicles generally serve to restrain the occupants in the motor vehicles in an accident in order, as far as possible, to avoid more severe injuries. The safety belt devices include, among other things, a belt retractor fixed to the vehicle and having a belt reel on which one end of the belt strap can be wound up. The other end of the belt strap can either be locked via a belt tongue in a belt buckle fixed to the vehicle or likewise be permanently attached to the vehicle via an end fitting. Insofar as the other end is fixed to the vehicle via an end fitting, the safety belt device further has a belt tongue guided displaceably on the belt strap, which belt tongue can be locked in a belt buckle fixed to the vehicle—for example, to form a three-point geometry of the belt strap.

Because of their task of restraining the occupant, the belt straps themselves must meet various requirements as to the tensile strength, the surface condition, the nature of the edges, and the like.

Furthermore, modern motor vehicles are provided with a plurality of electronic components, such as sensors, actuators, screens, acoustic units, heating and cooling devices, etc., the number of which will be expected to increase even further with increasing automation of motor vehicles, with their drive devices, control devices, and comfort devices. Furthermore, these devices must be connected to one another and to corresponding power sources and control devices via electrical lines. Insofar as these electronic components and lines are part of the safety belt device, these must be arranged accordingly on the safety belt device without impairing the use or the functionality of said safety belt devices.

It is already known from DE 10 2011 009 318 A1 to provide the belt strap with a hose segment extending in the longitudinal direction of the belt strap, into which hose segment the electronic components can be introduced.

Further details on how the hose segment is produced in the belt strap cannot be learned from the publication.

Also known from the publication EP 1 141 455 B1 is an inflatable, multilayer, folded safety belt having a central section and two edge sections which, in an accident, can be inflated by a gas flow released from a gas generator to form a hose with an increased diameter to reduce the load on the occupant upon being restrained. The safety belt is woven in two layers which are woven together in the region of the transitions of the sections and in the region of the outer edges. After weaving, the edge sections of the safety belt are folded onto the central section in a Z-shape. The seat belt is subsequently inverted and folded to the left, whereby the insides of the central section become the outside, and the edge sections come to lie in a cavity between the two layers of the central section. The safety belt is thereby simultaneously reduced to the width of a conventional safety belt of approximately 46 or 47 mm. Furthermore, the connections between the two layers of the central section respectively form the edge sections of the folded safety belt, which, in a first step, tear open to unfold the safety belt before the edge sections can unfold due to the entering gas flow. The inflatable safety belt is not intended for the introduction of electronic components into the cavity. Furthermore, the enlarged cavity is created only via the unfolding of the safety belt and, in the sense of a greatest possible reduction of the load on the occupant, is dimensioned as large as possible with such a volume that on its own would be much too large to accommodate the electronic components. Before the seat belt is inflated, the cavity is completely filled with the edge sections arranged therein, so that, for this reason also, arranging additional electrical components or lines there is not provided for—and would also be difficult to realize.

SUMMARY

Against this background, the invention is based upon the aim of providing a belt strap for a safety belt device of a motor vehicle having a cavity for receiving electronic components and lines, which safety belt is to be constructed as simply as possible and is also to be inexpensive to produce.

According to the invention, for achieving this aim, a belt strap having the features of claim 1 is proposed. Further preferred developments of the invention are to be learned from the dependent claims, figures, and the associated description.

According to the basic idea of the invention, it is proposed that the cavity be formed by two fabric layers which are connected to one another in the outer edge sections by one or more weave thread or threads running parallel to the longitudinal direction of the belt strap.

By means of the solution according to the invention, the cavity may already be produced during weaving of the belt strap. The belt strap is thereby woven in its basic structure in two, mutually-independent fabric layers which are connected to one another only in the edge sections by the weave threads. The weave thread provided for connecting the two fabric layers in the edge sections may thereby be woven in at the same time during weaving, so that the connection of the fabric layers during weaving is realized directly, and a further, separate work step for connecting the fabric layers is dispensed with. Since the weave threads serve only to connect the two fabric layers, but the tensile forces acting in the event of restraint are, as before, absorbed by the warp threads, it is sufficient if the weave threads are designed and arranged solely from the viewpoint of a reliable connection of the two fabric layers. The yarn thickness of the weave threads, the material of the weave threads, and also the number of weave threads may thereby be used as design parameters for the connection of the fabric layers.

It is further proposed that the belt strap have a width of 40 to 50 mm, and preferably 46 or 47 mm, and the edge sections in which the fabric layers are connected to one another by the weave threads each have a width of at least 2 mm, and preferably of at least 4 mm. The proposed width of the belt strap corresponds to the standard belt strap width. With the proposed dimensioning of the edge sections, it may be prevented that the belt strap loses its planar formation under the action of shearing forces, and that folds thereby form in the belt strap. In particular, it may thereby be prevented that the belt strap with the two fabric layers twists or warps under a lateral unrolling of the edge sections in the longitudinal direction. The width of the edge sections, and the associated planar connection of the fabric layers in the edge sections, may thereby be achieved, in particular, via a corresponding selection of the number and arrangement of the weave threads.

It is further proposed that the fabric layers be formed by a plurality of warp threads and weft threads. The warp threads run in the direction of the longitudinal direction of the belt strap and are connected to one another by the weft threads to form the flat weave. In the finished woven fabric, the warp threads thereby form the surfaces of the fabric layers, whereas the weft threads run between the warp threads and are not externally detectable in the case of a correspondingly dense fabric. The warp threads are designed to have a corresponding tensile strength and serve to absorb the tensile forces in the longitudinal direction of the belt strap, whereas the weft threads are finer and serve to hold the warp threads together.

The weave thread is thereby preferably woven in a 2/2-weave with the weft threads of the two fabric layers, whereby a uniform connection of the fabric layers to a smooth surface structure as homogeneous as possible can be achieved. A 2/2-weave is thereby to be understood as a weave in which, due to a switching of sides with respect to the two sheds of the two fabric layers during the weaving, the weave thread is, periodically, always arranged on two successive weft threads on one side and, on the subsequent two weft threads, on the other side of the belt strap. The respective, immediately adjacent weave threads, or also several adjacently-arranged groups of weave threads, may thereby preferably be oriented in such a way that they are each arranged on the opposite sides of the shed during weaving, and thus on opposite sides of the weft threads. As was already explained above, the weft threads serve to join the warp threads into the fabric layers. Due to the connection of the weft threads of the different fabric layers achieved by the weave threads, the warp threads are therefore also indirectly joined by the weave threads, so that a firm bond of the two, otherwise mutually independent, fabric layers results in the edge sections.

It is further proposed that the warp threads be connected to the weft threads in a 5/1/1-weave. What is understood by a 5/1/1-weave, based upon the above definition of the weaving of the weave thread, is a weaving of the warp threads with the weft threads, given which, in a periodic sequence, the warp threads are arranged to one side of the shed of a fabric layer during five successive weft threads, then switch sides of the shed for one subsequent weft thread, and subsequently switch sides of the shed again for a further weft thread, before they are arranged again on the other side of the shed for the repetition of the workflow for the next five weft threads. A haptically-optimized and friction-optimized surface may be achieved via the proposed weaving of the warp and weft threads. Respective fabric layers may thereby also be achieved which may be connected to one another particularly well by the weave thread with the proposed weave, forming a cavity.

The two fabric layers may additionally be connected to one another in one or more connecting sections arranged between the edge sections to form two or more cavities separated from one another. On the one hand, the connection of the fabric layers may be further improved via the proposed additional connection sections, and, on the other, several separate cavities may be achieved, e.g., for the purpose of a deliberately separate guidance of lines or a separate arrangement of electronic components.

BRIEF DESCRIPTION OF THE DRAWINGS

The invention is explained below using preferred embodiments with reference to the accompanying figures. In the figures.

DETAILED DESCRIPTION

Figure 1:
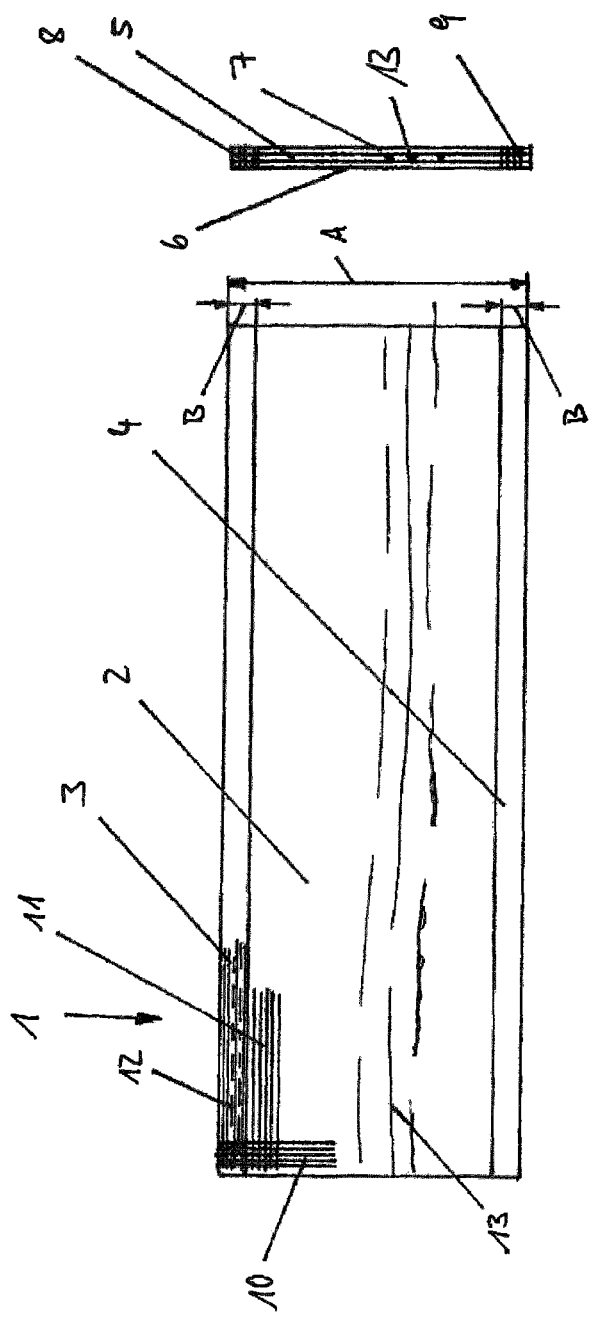
FIG. 1 shows a belt strap according to the invention in plan view and section view.

Shown in FIG. 1 is a belt strap 1 according to the invention in plan view and, in the depiction to the right, in section view. The belt strap 1 has two fabric layers 6 and 7, which are not connected to one another in a central section 2 and are connected to one another in two outer edge sections 3 and 4. The belt strap 1 has a width A of 46 or 47 mm, whereas the edge sections 3 and 4 each have a width B of 2 mm, and preferably of 4 mm.

The belt strap 1 has a plurality of warp threads 11 running in the longitudinal direction of the belt strap 1 which are woven with weft threads 10 running perpendicular thereto to form the fabric layers 6 and 7. Each of the fabric layers 6 and 7 thereby has warp threads 11 and weft threads 10 separate from one another so that they form independent fabric layers 6 and 7. The fabric layers 6 and 7 are connected to one another in the edge sections 3 and 4, as will be described in the following, so that a cavity 5 is formed between the fabric layers 6 and 7 which is delimited toward the edge sides by the connection in the edge sections 3 and 4. Three electrical lines 13 are arranged in the cavity 5 which, for example, may serve as an electrical connection of sensors or as signal lines for actuators of the safety belt device, or also for other devices in the vicinity of the safety belt device. Furthermore, further electronic components, such as smaller control or storage units, simple switches, acoustic playback devices, heating devices, or the like may also be arranged in the cavity 5.

The two fabric layers 6 and 7 are woven with one another by weave threads 12 provided in the edge sections 3 and 4, which, in the edge sections 3 and 4, form connecting sections 8 and 9 of the fabric layers 6 and 7. The weave threads 12 need not be provided over the entire width of the edge sections 3 and 4. For example, insofar as a particular weave is provided in the region of the edge of the belt strap 1 for the realization of as soft an edge as possible, the weave threads 12 in the outermost edge regions of the edge sections 3 and 4 may also be omitted, as long as this is not disadvantageous for the connection of the fabric layers 6 and 7.

The width B of the edge sections 3 and 4 is deliberately selected to be 2 mm so that the connection in the edge sections 3 and 4 imposes a planar form on the entire belt strap 1. This effect may thereby be increased even further in that the width of the edge sections 3 and 4 is chosen to be even larger—for example, with a width B of 4 mm or even larger. It is thereby prevented that the belt strap 1 twists or warps about its longitudinal axis upon the action of transverse forces as the edges of the edge sections 3 and 4 unroll. Insofar as is reasonable, the edge sections 3 and 4 can also be dimensioned even larger in the width B, whereby the size of the cavity 5 is reduced, however. For example, this may be reasonable if the cavity 5 is deliberately to be realized as narrower, in the form of a channel, whereby the arrangement and the course of the lines in the belt strap 1 may be predetermined or defined.

Figure 3:
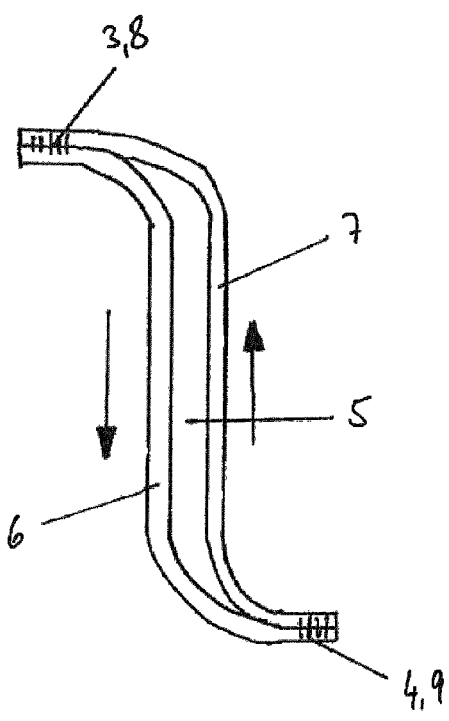
FIG. 3 shows a section view of the belt strap under the action of shearing forces.

In FIG. 3, the belt strap 1 is apparent in a sectional view under the effect of shearing forces acting in the direction of the arrow. Due to the action of the shearing forces, the fabric layers 6 and 7 are displaced counter to one another, transverse to their longitudinal extent, so that a compressive force is exerted respectively on the edge sections 3 and 4 or the connecting sections 8 and 9 of one of the fabric layers 6 and 7, whereas a tensile force is exerted by the respective other fabric layer 6 and 7. These force relationships lead to the edge sections 3 and 4 being deflected laterally, as is apparent in FIG. 3. Were the edge sections 3 and 4 not connected according to the invention, the edge-side connection points of the fabric layers 6 and 7 would thereby roll up in the circumferential direction, and the belt strap 1 would twist or warp about its longitudinal axis, whereby the flat formation of the belt strap would in turn be lost, and the wearing comfort would be negatively affected. Due to the connection according to the invention of the fabric layers 6 and 7 in the edge sections 3 and 4 over a width B of at least 2 mm, and preferably of at least 4 mm, it is prevented that the connection unrolls in the circumferential direction. In practice, a planar formation is imposed on the belt strap 1 in the edge sections 3 and 4. Conversely, the prevention of the unrolling of the edge sections 3 and 4 also has the effect that, given a cessation of the shearing forces, these exert restoring forces on the belt strap 1 and the fabric layers 6 and 7, and thereby automatically force the belt strap 1 and the fabric layers 6 and 7 back into the flat orientation, which is shown in the depiction on the right in FIG. 1.

Figure 2:
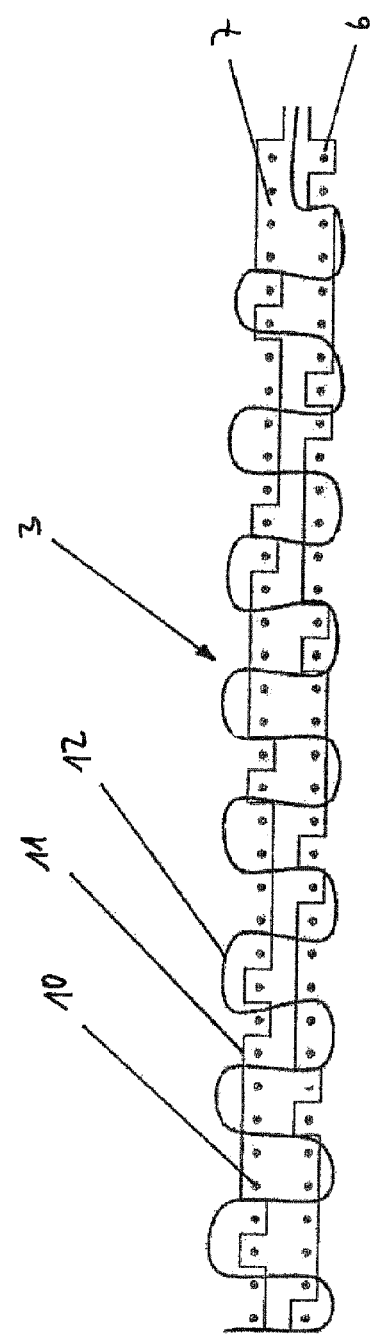
FIG. 2 shows a longitudinal section through an edge section of the belt strap in an enlarged, exploded view.

The belt strap 1 is apparent in FIG. 2 in a section through the edge section 3. The two fabric layers 6 and 7 are woven in a 5/1/1-weave. The switching of the warp threads 11 from one side to the other side of the shed in the loom of a fabric layer 6 or 7 is chosen such that, in a periodic sequence, they are first arranged on one side of the shed, while five weft threads 10 are passed through the shed. The warp threads 11 subsequently switch to the other side of the shed for the passage of a next weft thread 10. For a further passage, the warp threads 11 are subsequently moved back to the other side of the shed, before they switch back to the other side of the shed for repetition of the weaving rhythm for the subsequent five weft threads 10 of the next period. This results in a rhythm with five respective weft threads 10 that cover the warp threads 11 towards one side, one subsequent weft thread 10 that covers the warp threads 11 to the other side, and, subsequently, again one weft thread 10 that covers the warp threads 11 toward the other side, before the rhythm is repeated, wherein the next period begins with five respective weft threads 10 that, in comparison to the previous rhythm, cover the warp threads 11 on the other side of the warp threads 11. The warp threads 11 of a fabric layer 6 or 7 are woven into bundles (multifilaments) or, individually, as monofilaments. A first bundle of warp threads 11 is thereby woven in the described rhythm, whereas an adjacent second bundle of warp threads 11 is woven in an identical, but offset, rhythm. However, the warp threads 11 of the two different fabric layers 6 and 7 are also woven offset relative to one another in the same described weaving rhythm, as can be seen in FIG. 2.

Instead of the described 5/1/1-weave, a 3/1-weave or a 5/1/1/1-weave would also be conceivable, wherein, in principle, weft threads 10 of a yarn thickness of 100 to 1,100 dtex may be used as monofilaments or multifilaments.

The two fabric layers 6 and 7 woven separately from one another in this way are connected to one another by at least one weave thread 12 in the illustrated edge section 3. The weave thread 12 is woven in a 2/2-weave with the weft threads 10 of the two fabric layers 6 and 7, i.e., the weave thread 12 is guided on one side of the shed of one of the fabric layers 6 or 7 for two weft threads 10 of the two fabric layers 6 and 7, and then switches to the opposite side of the shed of the other fabric layer 6 or 7.

In the finished woven belt strap 1, the weave thread 12 thus runs periodically for two weft threads 10 on the underside of the lower fabric layer 6 in the illustration, and for the next two weft threads 10 on the upper side of the upper fabric layer 7 shown in the illustration. It thus periodically runs alternately on the two free surfaces of the fabric layers 6 and 7, and thereby switches sides in that it passes through the weft threads 10 of both fabric layers 6 and 7 to the other free surface. The weave thread 12 may likewise be woven in bundles as multifilaments, wherein, moreover, several bundles or individual weave threads 12 may also be provided that may each be woven offset relative to one another. This is reasonable, in particular, for realizing the width B of the edge sections 3 and 4, in order to simultaneously realize a correspondingly flat design of the edge sections 3 and 4, given the width B.

In principle, the weave threads 12 may differ from the warp threads 11 in material, yarn thickness, color, elongation, and various other properties, since, for realizing the connection, they fundamentally have a different function than the warp threads 11. For example, the weave threads 12 need not absorb any tensile forces in the event of a load, so that they may be formed from a yarn with a lower yarn thickness than the warp threads 11.

In the illustration of FIG. 2, the fabric layers 6 and 7, in the course of the warp threads 11, the weft threads 10, and the weave thread 12, have been pulled apart, with the weft threads 10 of the two fabric layers 6 and 7 shown each arranged in one plane so that the weave pattern is more apparent. In the finished woven belt strap 1, however, the warp threads 11, the weft threads 10, and the weave thread 12 are provided to be significantly more densely together in a flat weave, wherein around 10 to 15 weft threads 10 may be provided per cm of length of the belt strap 1.

The invention claimed is:

1. A belt strap for a safety belt device of a motor vehicle, comprising:
   at least one cavity for receiving electronic components and/or lines,
   wherein the cavity is formed by two fabric layers connected to one another in outer edge sections by one or more weave thread or threads running parallel to a longitudinal direction of the belt strap,
   wherein the fabric layers are formed by a plurality of warp threads and weft threads, and the warp threads are connected to the weft threads in a 5/1/1-weave.

2. The belt strap according to claim 1, wherein the belt strap has a width of 40 to 50 mm, and the outer edge sections in which the fabric layers are connected to one another by the weave threads each have a width of at least 2 mm.

3. The belt strap according to claim 1, wherein the weave thread is woven in a 2/2-weave with the weft threads of the two fabric layers.

4. The belt strap according to claim 1, wherein the two fabric layers are connected to one another in one or more connecting sections arranged between the edge sections to form two or more cavities separated from one another.

5. The belt strap according to claim 1, wherein at least one electrical line and/or an electronic component is arranged in the cavity.

6. A belt strap for a safety belt device of a motor vehicle, comprising:
   at least one cavity for receiving electronic components and/or lines,
   wherein the at least one cavity is formed by two fabric layers connected to one another in outer edge sections by one or more weave thread or threads running parallel to a longitudinal direction of the belt strap, and
   wherein the two fabric layers are connected to one another in one or more connecting sections arranged between the outer edge sections to form two or more cavities separated from one another.

7. The belt strap according to claim 6, wherein the belt strap has a width of 40 to 50 mm, and the outer edge sections in which the fabric layers are connected to one another by the weave threads each have a width of at least 2 mm.

8. The belt strap according to claim 6, wherein the fabric layers are formed by a plurality of warp threads and weft threads.

9. The belt strap according to claim 8, wherein the weave thread is woven in a 2/2-weave with the weft threads of the two fabric layers.

10. The belt strap according to claim 8, wherein the warp threads are connected to the weft threads in a 5/1/1-weave.

11. The belt strap according to claim 6, wherein at least one electrical line and/or an electronic component is arranged in the cavity.

* * * * *